May 21, 1929.   E. J. LE CLAIRE   1,713,539
POP CORN HUMIDOR
Filed April 5, 1926   2 Sheets-Sheet 1
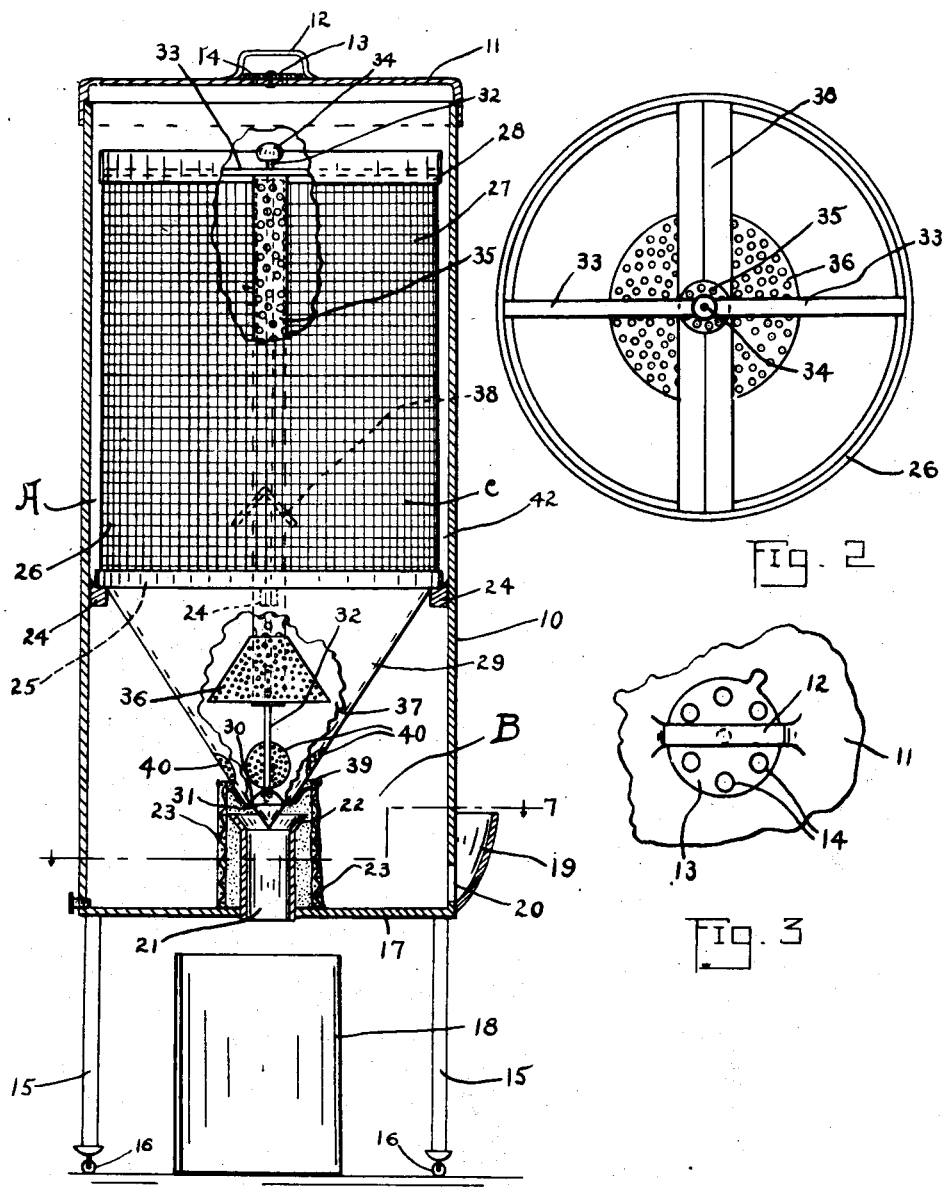
Inventor
Eugene J. LeClaire
Attorney May 21, 1929.   E. J. LE CLAIRE   1,713,539
POP CORN HUMIDOR
Filed April 5, 1926    2 Sheets-Sheet 2

Eugene J. LeClaire
Inventor
By ⎯⎯⎯⎯ Attorney

Patented May 21, 1929.

1,713,539

UNITED STATES PATENT OFFICE.

EUGENE J. LE CLAIRE, OF ST. PAUL, MINNESOTA, ASSIGNOR OF ONE-HALF TO CHARLES J. MULLAN, OF ST. PAUL, MINNESOTA.

POP-CORN HUMIDOR.

Application filed April 5, 1926. Serial No. 99,744.

My invention relates to popcorn humidors wherein it is desired to provide means for treating the popcorn so that when it is ready to be popped it will burst open with a force and vigor so as to entirely explode the kernel from the shell, thereby providing a very delicious and large popped kernel.

Heretofore a great deal of difficulty has been experienced with popcorn in popping the same because even with the same grade of popcorn, sometimes it will pop very readily and at other times it seems as though the popcorn is small and tough, without the apparent popping life that must be prevalent in producing good popped corn. My invention provides a container and particularly a humidor for treating the popcorn in a manner so that it will always be in readiness to provide a practically uniform popping of the same and exploding the kernels in such a manner so as to make them burst into the largest possible size, thus providing a delicious, tender corn when popped.

My humidor and method of treating the popcorn consists in providing a container wherein a quantity of the unpopped kernels of corn are held and stored in a very convenient manner. The method consists in permitting the corn to remain within the container and humidifier for at least a certain length of time until the corn has been properly cured.

The humidor includes means for supporting the kernels within the same so that moist atmosphere will be directed in and about the kernels in a manner so that they may absorb sufficient moisture to properly cure the kernel before it is used. This includes means for spacing the corn reservoir with an air passage about the same and of an open mesh nature so that the moist air may be directed in and about and through the container holding the kernels. Within the container I provide a valve and dispensing means so that the kernels at the lowermost portion of the container may be drained out, the dispensing means being of a nature so as to cause the kernels to drain evenly throughout the entire bottom of the container and permit the kernels from above to settle down into the position formerly assumed by the kernels which have been drained out.

A feature of my invention resides in a humidor for popcorn wherein a quantity of unpopped corn can be cured and when some of the corn is desired for popping, it is only necessary to place a receptacle at or beneath the humidor and operating valve means which permits the popcorn to drain out into the receptacle to an amount desired, thereby providing a convenient means of storing the popcorn until it is desired for use.

My invention also provides means for directing warm air to the humidifier in a manner so as to stimulate the curing action and to force the humidifying of the air within the humidor.

These features with other details of construction and advantages in my method and means of curing and humidifying popcorn will be more clearly and particularly set forth in the specification and claims.

In the drawings forming part of this specification:

Figure 1 is a side sectional elevation of my humidor.

Figure 2 is a plan view of the kernel container removed from the humidor.

Figure 3 is a plan view of a portion of the cover illustrating the air valve in the same.

Figure 7:
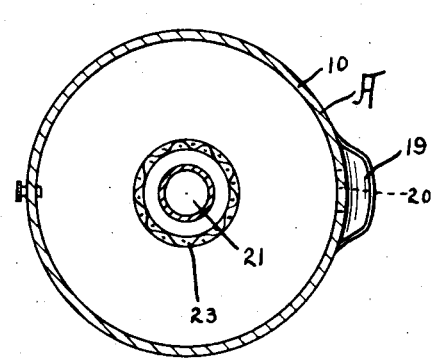
Figure 7 is a section on the line 7—7 of Figure 1.

In the drawings my humidor A includes the casing 10 which may be of a cylindrical nature and which is provided with a cover 11 having handles 12 and an air valve 13 which may be opened or closed to permit air to pass through the openings 14 in the valve and cover.

The casing 10 of my popcorn humidor A is supported upon the legs 15 which are mounted on casters so that the same may be moved from place to place if it is desired. The legs 15 support the casing 10 with the bottom 17 of the same elevated sufficiently so that a kernel receiving receptacle 18 may be placed beneath the bottom 17 conveniently by sliding the same between the legs 15. The casing is preferably supported by four legs so that the same will be sufficiently strong to support a quantity of popcorn within the casing 10 and in fact, so that a hundred pound sack, more or less, of kernels of popcorn may be readily placed within the humidor A.

The casing 10 is provided with a moisture chamber B which is adapted to be filled through the fount 19 which projects from the side of the same, so that water can be poured in through the fount 19 and so that it may be readily apparent from the outside just how much water is within the humidor A. The fount 19 connects with the chamber B by means of the opening 20 and to properly function, it is desirable to have the water level within the chamber B, high enough to seal the opening 20.

The moisture chamber B is provided with a central opening or passageway 21 which is formed with a funnel-shaped upper end 22 and about which the moisture wicking 23 extends so as to provide means for drawing the moisture up about the opening 21 to cause any moisture passing up through the opening 21 to pass over the wicking 23, thereby urging the evaporation of moisture from the moisture chamber B up into the humidifying chamber C of the humidor A.

Within the humidifying chamber C I provide four lugs 24 projecting from the side walls of the casing 10 which are adapted to form a seat or shoulder against which the annular rim 25 of the popcorn kernel container 26 is adapted to rest so as to support the container 26 centrally within the casing 10 in the chamber C.

The kernel container 26 may be of a cylindrical construction having an open mesh outer cylindrical wall 27 with a lower reinforcing band 25 and an upper reinforcing band 28. The lower end of the receptacle 26 is formed to provide the conical dispensing end 29. This conical end is adapted to extend into close proximity to the wicking 23 so that the air passing up through the passageway 21 is adapted to be caused to practically go through or in close proximity to the wicking which draws the moisture up from the moisture chamber B into the humidifying chamber C.

The dispensing end 29 is formed with an opening 30 in the apex of the same which extends in close proximity to the funnel-shaped portion 22 of the passageway 21. This permits the kernels of corn to pass through the opening 30 and out through the opening 21 into the receptacle 18. The opening 30 is adapted to be closed by the valve 31 which is supported on the centrally disposed rod 32 which extends up through the container or receptacle 26 and through the cross-bar 33, being provided with an operating handle 34 on the upper end of the same.

For the major portion of the rod 32 I provide a central flue member 35 which is formed of perforated material so as to permit air to pass through the same and at or near the lower end of this flue I provide a cone-shaped deflector 36, the enlarged end of which is adapted to extend in close proximity to the inner surface of the conical end 29 to provide an annular opening 37 through which the popcorn kernels drain from the container 26. This causes the popcorn to be fed evenly through the opening 37 and out through the opening 30 when the valve 31 is raised.

Within the container 26 I provide an angularly, transversely disposed deflector 38 which acts as a brace for the tubular member 35 near the lower end and also breaks the kernels of popcorn so as to divide the same as they settle down over the deflector 38 toward the dispensing end 29.

Adjacent the upper edge 39 of the wick 23 I provide perforated portions 40 which permit the passage of air through the same. This allows the air to pass out or up through the dispensing end 29 even though the valve 31 is closed.

The container 26 is freely disposed within the casing 10 and is adapted to be spaced and supported by the lugs 24 so as to provide an annular space 42 about the same which permits the air to pass about the container 26 and permitting the moist air to be extended through the open mesh 27 so as to come readily in contact with the kernels of popcorn within the container 26.

Figure 6:
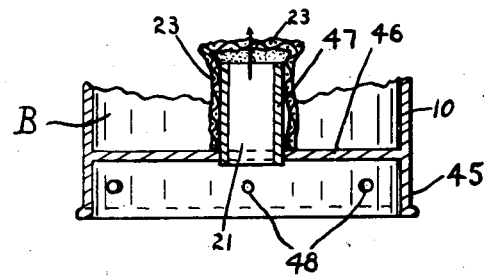
Figure 6 is a sectional detail of a portion of my humidor.

In Figure 6 I have illustrated the casing 10 provided with a lower rim 45 which supports the bottom 46 and through which the tube 47 extends to provide a central opening in the bottom 46. About the tube I provide the wick 23 which is adapted to draw the moisture upward along the tube from the bottom of the casing 10. In this construction I do not have the supporting legs 15 as the rim 45 takes the place of the same and I therefore provide openings 48 to permit the air to pass beneath the cover 46 and up through the tubular member 47.

Figure 5:
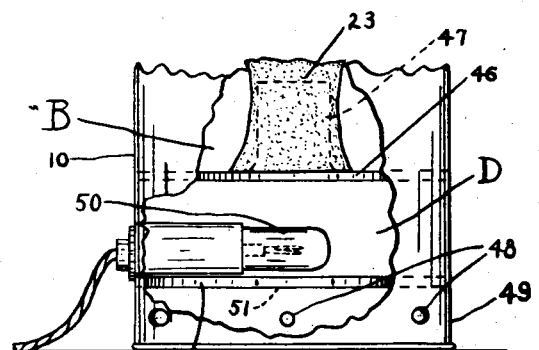
Figure 5 illustrates a detail of my humidor, showing the means for heating the air passing into the same.

In Figure 5 I have illustrated the casing 10 provided with a lower compartment D which is directly above the lower supporting flange 49 and in this compartment I provide a heater such as 50 which may be an electric lamp or any other suitable heating means so as to heat the air within the compartment D and as the air is drawn through the openings 48 in the rim 49 and up through the central opening 51 in the bottom 52 of the compartment D, the air is directed directly against the heater 50 and permitted to pass up through the tubular member 47. In this construction the wick 23 operates in the same manner to draw the moisture up from the moisture compartment in the lower part of the casing 10 and provides means for stimulating the humidifying of the air within the casing 10.

Figure 4:
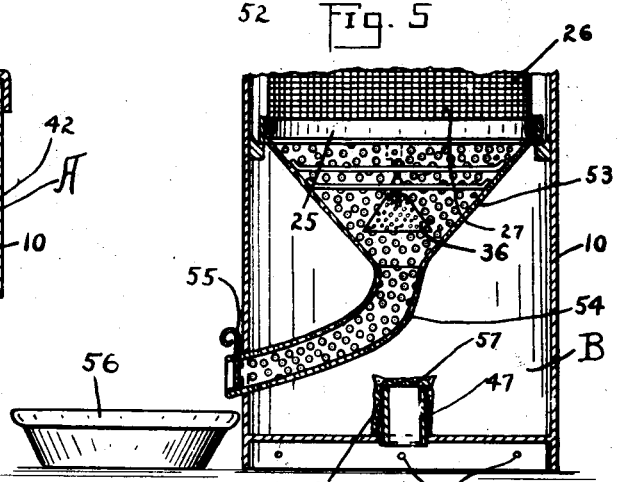
Figure 4 is a detail of another form of my humidor partly in section.

In Figure 4 I have illustrated the lower portion or conical dispensing end of the container 26 with a perforated construction 53 which permits the air to pass up or into and about the dispensing end 53, thus permitting the moisture to penetrate and come in contact freely with the kernels of popcorn within the same.

In this construction in Figure 4 I have provided a tubular drain member 54 which is formed of perforated material to permit the humidity to penetrate the same and which extends to one side of the casing 10 in a manner so as to permit popcorn kernels to be drained out of this tube 54 when the slide valve 55 is lifted. This permits popcorn to be drained into the dish 56 and permits the lower portion B to provide the necessary humidifying chamber by permitting water to be filled into the same and having a wick member 57 which covers the tubular member 47 and of an open mesh nature so that the air passing up through the tubular member 47 is adapted to be of a moist nature, and thus provide the necessary humidity within the casing 10 to treat the kernels of popcorn and cure the same sufficiently with moisture so that when the kernels are drained out through the tube 54 after the kernels have remained within the container 26 a sufficient length of time, the kernels will be treated and cured sufficiently to cause them to pop most effectively. This means of treating popcorn prevents the same from drying out and also provides a means of being assured of practically a uniform popping of the corn at all times.

In Figure 7 I have illustrated the lower portion of my humidor A showing the trough 19 into which the water is poured to the compartment B and by which the observation can be made to note whether or not any moisture remains within the compartment. This provides a simple and effective means of keeping my humidor filled with water so as to provide the necessary moisture within the same.

Figure 8:
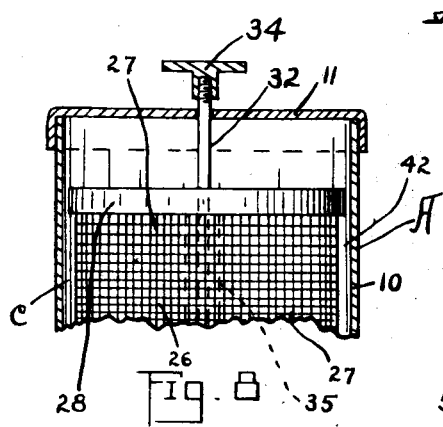
Figure 8 is a sectional detail of the top of my humidor, showing the handle coming through the cover of the same. In this construction the operating handle is removable so that the cover can be opened.

In Figure 8 I have illustrated the cover 11 of my humidor A provided with the operating handle 34 extended through the same so that the rod 32 may be operated from outside of the casing and thus making it unnecessary to remove the cover whenever it is desired to operate the valve 31. However, when it is desired to remove the cover 11 to place more popcorn within the container 26 it is then necessary to remove the operating end of the handle 34 which may easily be done.

My method of treating kernels of popcorn with my humidor A is simple, yet it is very important as it permits the kernels to be stored in an atmosphere with the necessary humidity so that the kernels will not dry out, but rather will absorb sufficient humidity from the atmosphere round about the same within the casing 10 so as to cause the kernels to pop more readily. Kernels of popcorn treated with my method, pop with an exploding force, breaking the kernel in such a manner as to cause it to fluff out into a delicious tasty popped kernel of corn. The results are surprisingly effective where old apparently dried out corn is placed into my humidor A and left a sufficient length of time to become properly cured. Such corn may be popped apparently perfectly and the change is so marked as to make my device most desirable for the storing and curing of popcorn kernels to prepare the same for the popping operation.

In accordance with the patent statutes I have described the principles of operation of my method and means of storing and treating popcorn kernels and while the drawings illustrate a particular form and construction, I desire to have it understood that this is only illustrative and that the invention can be carried out by other means and applied to uses other than those above set forth within the scope of the following claims.

I claim:

1. A humidor for treating kernels of popcorn consisting in providing a casing having an air opening, a container within said casing, a liquid chamber in said casing, and wick means surrounding said air openings to stimulate the evaporation of the liquid within said casing and to humidify the air therein to treat the kernels of popcorn in said container.

2. A humidor comprising a container for receiving the kernels of popcorn, a casing adapted to inclose said container, a liquid chamber in said casing, said casing having an opening therein, a wick member associated with said opening in a manner to cause moist air to be carried up into said casing by the inflow of air through said opening, and means for draining the treated kernels of popcorn within said container out through said opening.

3. A device for treating kernels of popcorn including, a casing, a kernel storing container adapted to fit in said casing formed of open mesh material, a liquid chamber in said casing, a filling fount associated with said chamber to facilitate filling and observation as to the amount of liquid within said liquid chamber, liquid absorbing means extending from said liquid chamber to stimulate the evaporation of liquid within said casing, and drain means whereby treated popcorn may be dispensed from said device.

4. A popcorn humidor including, means for treating the kernels of popcorn by exposing the same to humidified air within a container, means for leading liquid into said container from the exterior thereof and sealing the same by the liquid from the outer atmosphere, and means for draining the treated kernels of popcorn out of said humidor.

5. A humidor consisting of a casing, a container for material within said casing and spaced therefrom, said container having perforations therein, means on said container for dispensing the material and means upon said casing allowing the material to flow by gravity therethrough when said dispensing means is operated.

6. A popcorn humidor comprising, a humidifying chamber, a removable kernel container within said chamber, a dispensing means formed on said kernel container and said humidifying chamber having an opening aligned with said dispensing means.

7. A humidor comprising a casing, a container located entirely within and spaced from said casing for holding material, said container having an outlet located within said casing and means at the top of said container controlling said outlet.

EUGENE J. LE CLAIRE.